US005146051A

United States Patent [19]

Hermann

[11] Patent Number: 5,146,051

[45] Date of Patent: Sep. 8, 1992

[54] HOUSING SHELL FOR AN IN-THE-EAR HEARING AID

[75] Inventor: Dietmar Hermann, Schienfeld, Fed. Rep. of Germany

[73] Assignee: Siemens Aktiengesellschaft, Munich, Fed. Rep. of Germany

[21] Appl. No.: 552,525

[22] Filed: Jul. 16, 1990

[30] Foreign Application Priority Data

Jul. 26, 1989 [EP] European Pat. Off. ........ 89113792.9

[51] Int. Cl.[5] ........................ H04R 25/02; B29C 33/40

[52] U.S. Cl. .................................... 181/130; 181/135; 264/222/DIG. 30; 381/68.6

[58] Field of Search ................. 181/130, 135, 22, 129; 381/68.6, 69.2; 264/222, DIG. 30

[56] References Cited

U.S. PATENT DOCUMENTS 3,440,314 4/1969 Frisch ................................ 264/222
4,569,812 2/1986 Werwath et al. .................. 264/222
4,617,429 10/1986 Bellafore ......................... 170/107 E
4,712,245 12/1987 Lyregaard ......................... 381/68.6
4,739,512 4/1988 Hartl et al. ........................ 381/68.6
4,871,502 10/1989 Labisch et al. .................... 181/129
5,008,058 4/1991 Henneberger ..................... 264/222

FOREIGN PATENT DOCUMENTS 0206213 12/1986 European Pat. Off. .
0245742 11/1987 European Pat. Off. .
0248955 12/1987 European Pat. Off. .
8436783 12/1984 Fed. Rep. of Germany .
8613336 10/1987 Fed. Rep. of Germany .
3616648 11/1987 Fed. Rep. of Germany .

OTHER PUBLICATIONS

"Information about . . . SIRETTINA" Siemens AG, Brochure No. M-H 170/1418.

*Primary Examiner*—Jay H. Woo
*Assistant Examiner*—Scott Bushey
*Attorney, Agent, or Firm*—Hill, Van Santen, Steadman & Simpson

[57] ABSTRACT

A positive ear mold is processed to the desired size, equipped with a core in the proximal region, dipped in wax and placed in a container in which casting material for a negative form is filled. After the ear mold has been taken out and the core has been removed, a flexible sliver is drawn into the negative form. The sliver is laid out along the inner wall of the negative form prior to casting, and subsequently, the material for the housing shell is filled into the negative form. After a brief polymerization time, the excess material is emptied out and after it has hardened, the housing shell is removed from the negative form. By pulling a sliver insert out of the channel molded in the housing shell, one obtains a housing shell having a vent molded therein.

9 Claims, 1 Drawing Sheet

HOUSING SHELL FOR AN IN-THE-EAR HEARING AID

BACKGROUND OF THE INVENTION

1. Field of the Invention

The present invention relates to a housing shell for an in-the-ear hearing aid and to a method and apparatus for manufacturing the same by making a positive ear mold and from that a negative mold for the housing shell including providing a venting channel therein.

2. Description of the Prior Art

Among the in-the-ear hearing aids, one differentiates between custom-made devices which are either mainly carried in the outer ear as conch devices and merely project into the auditory canal with an ear-matching piece (Siemens Hinweise zur Anfertigung von Ohrpasstuecken fuer Im-Ohr-Geraete SIRETTINA PA 3801, Order No. MH 170/1418, published 1980) or which are placed for the most part in the auditory canal as auditory canal devices, as known from the German Utility Model 84 36 783 and the European application 0,248,955. Also known in the art are module-in-the-ear devices, as known from the European application 0,206,213 and the German application 36 16 648, which are composed of standard module hearing aids, which are integrated in shells or otoplastics manufactured according to the individual mold of the patient.

In addition to a sound entry opening to the microphone and a sound channel from the receiver through a sound exit/trumpet to the eardrum of the person wearing the hearing aid, in-the-ear hearing aids are provided with a further opening and a channel which enables ventilation of the auditory canal that is actually closed by the device. Apart from pressure compensation, this additional channel, also called a vent, can also serve for the manipulation of the frequency response of the hearing aid depending on how it is laid out (course, diameter boring), and it can be adapted to the hearing loss of the person wearing the hearing aid.

For the manufacturing of an in-the-ear device with a vent channel, a conventional procedure provides that the acoustical engineer active in the field of hearing aids, for example, creates a positive mold of the ear of the hearing-impaired person. This mold, particularly on that side not facing the ear drum, the distal end of the mold, is planarly cut, provided with a mold release, expediently the entire ear mold is dipped in wax, and with the application of a matching shell, a negative of the ear mold is cast. After the ear mold is taken out of the negative form, the form is filled with plastic material (e.g. polymethyl methacrylate, known by the name Acryl PMMA) for the generation of a housing shell for the hearing aid. After a brief polymerization time, the excess plastic material is poured out of the negative form. After the casting or extrusion/injection molding, the negative form with the housing shell located therein is placed in a pressure pot, for example, and over a time interval of approximately 10 minutes, the plastic is hardened (polymerized). Subsequently, the housing shell is taken out of the negative form.

The hardened blank part of the housing shell that is taken out of the negative form is cleared proximally and distally from excess plastic material as indicated in FIG. 5 by the lines c—c and e—e. This occurs by way of abrading or sawing or milling and polishing. Furthermore, an opening is cleared (drilled, milled open) at the proximal end of the housing shell blank. Subsequently, the shell is polished.

For the creation of a ventilation channel or vent, with time-consuming work that requires great care, a groove is applied into the inner wall of the housing shell over the entire length of the shell by means of a milling tool starting at the distal end or the proximal end. In this groove, a silicon hose encasing a core of solder wire is placed and fastened at the shell from the exterior. Now, a mixture of the plastic material for the shell is prepared and applied on the sleeve of the silicon hose with a tool (spatula) such that inside the housing shell the hose is covered and embedded over its entire extent. For the hardening of the masking material for the silicon hose, the blank of the housing shell is once again placed, for example, in a pressure pot for a certain period of time. Subsequently, the excess masking material is milled off and polished off in order to create space in the housing shell for the integration of the components of the hearing aid. Thereby, it must be observed and checked that the channel which results after the silicon hose is pulled out has a closed jacket/sleeve.

In the following, the blank of the housing shell is ground/cut off in the conch area (distal end) and in the area of the auditory canal (proximal end) to the desired shape of the housing shell. Finally, a face plate can be applied at the distal end and an end plate or cerumen cap or such at the proximal end. Thereby, the inlet and outlet openings of the vent are to be drilled if necessary. If the vent ends before the cerumen cap in the area of the proximal end, an opening must be drilled into the wall of the housing shell.

SUMMARY OF THE INVENTION

It is the object of the present invention to provide a method and an apparatus, as well as to fashion the housing shell of an in-the-ear hearing aid, such that it becomes easier to manufacture an in-the-ear hearing aid that can be technically improved.

The above object is achieved, according to the present invention in a method for manufacturing a housing shell for an in-the-ear hearing aid by manufacturing a positive ear mold from the ear of the hearing-impaired person, processing the ear mold to the desired size of the housing shell to be manufactured, applying a core to the ear mold on the side of the auditory canal, at the proximal region, applying a separating layer, such as wax or the like, on the outside of the ear mold, generating a negative form of the ear mold, removing the ear mold from the negative form and removing the core therefrom, drawing a flexible sliver, a pipe, hose or the like, in the negative form, laying out the sliver along the inner wall of the negative form, pouring plastic into the negative form, pouring out excess material from the negative form that is not required for the housing shell to be manufactured after a short polymerization time, hardening the housing shell in the negative form, removing the housing shell from the negative form and pulling out the sliver, pipe or hose insert from the channel molded into the housing shell.

The above feature is also implemented by an apparatus which is particularly characterized by an ear mold material for making a positive ear mold, a cutting, milling, polishing device or the like for the processing of the ear mold to the desired size or shape, a core that can be plugged into the ear mold, and application device for a separating layer, such as a wax bath or the like, a form, container or the like to accept the ear mold and to fill in casting compound for a negative form thereof, a flexible sliver such as a pipe, hose or the like to be inserted into the negative form and that extends through the cavity of the negative form and the opening thereof created by the core, a castable or injection moldable material for the housing shell, a device for hardening (polymerizing) of the housing shell, and means for pulling a sliver, pipe, hose or the like out the channel created in the housing shell.

According to the invention, a housing shell may be manufactured in which a channel is molded whose walls are composed of a material of a cast-in or injected sliver, pipe, hose or the like, and whereby such element is embedded in the material of the housing shell.

According to the invention, the channel for the ventilation or the venting channel can be generated in one step with the casting or molding of the blank of the housing shell. Thereby, this channel or several such channels corresponding to the space available, for the hearing aid can be laid out as desired in the negative form and adjusted. The spatial conditions, the size of the vent (channel length, channel course and channel diameter) can already be taken into consideration in the negative form and varied, i.e. the channel location, channel size, channel shape, etc can already be determined in the negative form. Furthermore, a uniform wall thickness of the venting channel relative to the housing shell can be achieved since the sleeve of the sliver, pipe or hose that is immediately integrated in the housing shell enables an even distance to the shell material, or respectively, the shell. By eliminating the milling event for a groove, by eliminating the embedding and the material application on the integrated hose, by eliminating the second hardening and heat treatment, and since refinishing for the most part becomes unnecessary, the manufacturing of the housing shell is considerably simplified and is accomplished in less time.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
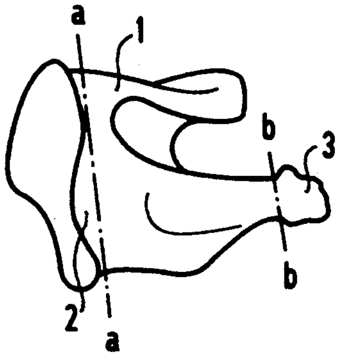
FIG. 1 is an elevation view of a positive ear mold obtained from a blank prior to separating an overprojecting material section 2 in the region of its distal end along a cutting line a—a and, respectively, at a sprue gate piece 3 in the region of its proximal end along the cutting line b—b.

FIG. 1 illustrates a blank, including a positive ear mold 1 which is obtained from the blank by separating an overprojecting material section 2 in the region of its distal end along the cutting line a—a and, respectively, a sprue gate piece 3 in the region of its proximal end along a cutting line b—b.

Figure 2:
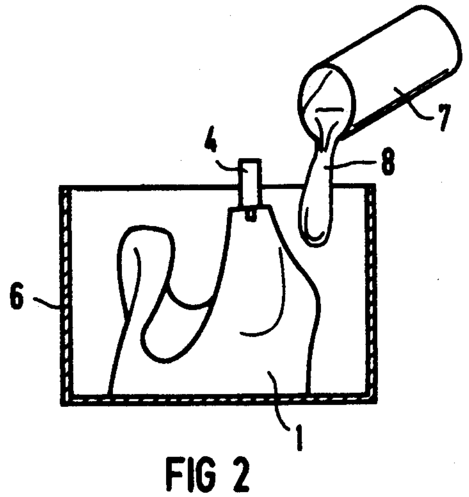
FIG. 2 is an elevation of an ear mold according to FIG. 1 provided with a core and arranged in a casting container (shown in section) and in making a negative form.

FIG. 2 illustrates the ear mold according to FIG. 1 equipped with a core 4 at the side next to the auditory canal (proximal end) and which is arranged in a container 6 for the casting of a negative form. In the exemplary embodiment illustrated here, the negative form of the ear mold 1 is cast by way of a vessel 7 which contains a plastic material, a casting material 8 or the like. Before casting or injection/extrusion molding of the negative form, the entire ear mold 1 is advantageously first dipped in wax or the like in order to obtain a separating layer. Via the separating layer, a compensation for a possible later physical depletion of material can be achieved.

Figure 3:
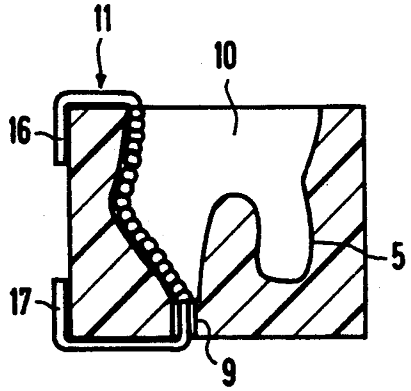
FIG. 3 is a sectional view of the negative form after removal of the ear mold and the core, and after removal from the container.

FIG. 3 illustrates the negative form 5 after the ear mold 1 and the core 4 have been removed, the negative form 5 being inverted such that the bottom part of FIG. 2 is illustrated at the top in FIG. 3. An opening 9 is provided from the removal of the core 4. As shown in FIG. 3 in an enlarged manner, through a cavity 10 of the negative form and through the opening 9, a flexible sliver 11, a tube, a hose or the like, is placed in or integrated such that it extends along the inner wall of the negative form in the manner of the desired course of a channel for the ventilation or as a vent in the housing shell to be manufactured.

Figure 4:
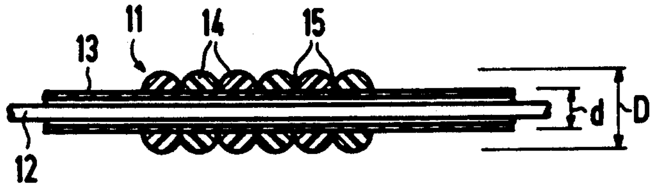
FIG. 4 is an enlarged sectional view of a sliver for generating a channel.

An enlarged section of a flexible sliver 11 is illustrated in FIG. 4. For the generation of a channel according to this exemplary embodiment, a flexible sliver serves the purpose and is composed of a core 12 of a flexible material, e.g. a metal thread, particularly a sleeve whose material does not engage in connection with the shell material when the housing shell is cast or molded, and a plurality of small spheres 14, beads or the like, lined up on a hose sleeve 13 and which are preferably composed of similar or the same plastic material as the material that is used for the manufacturing of the housing shell. The metal thread 12, for example a soldering lead, is not supposed to have the elasticity of a spring, but is to be easily and permanently deformable. Detents or bays 15 between the spheres or balls 14 enable and provide for flexibility of the sliver 11 and are filled out with the shell material when the housing shell is cast or molded, so that a uniformly-strong wall thickness results for the channel to be established. Whereas the diameter of the core 4 used for the generation of the opening 9 in the negative form 1 approximately corresponds to the outer diameter D of the sliver 11, or, respectively, according to the exemplary embodiment to the outside diameter d of the hose 13, the diameter d, composed of the thickness of the metal thread 12 or of the diameter of the silicon sleeve 13 or of the boring diameter of the balls 14, determines the clear cross-sectional dimension of the channel.

On the section which is guided through the negative form and which serves for the formation of a channel in the housing shell, the flexible sliver 11 carries the small balls 14 composed of polymethyl methacrylate, and is fastened with its ends 16, 17 outside on the negative form. It must be observed that the small balls 14 reside at the inner wall of the negative form along the desired course; then, the negative form is cast or extrusion molded with polymethyl methacrylate for the generation of a housing shell 18. After a short polymerization time, the excess plastic material is emptied out of the negative form, and then the negative form is placed in a pressure pot, for example, for the hardening of the housing shell 18.

Figure 5:
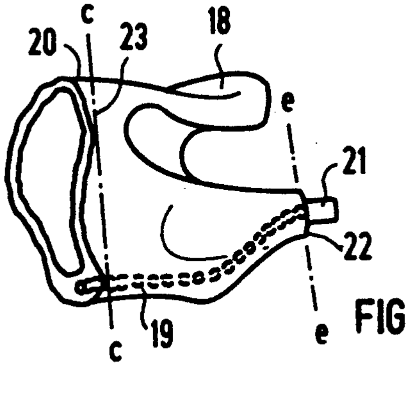
FIG. 5 is an elevation of the housing shell including the channel after removal from the negative form, shown with overprojecting casting rests which may be removed along the cutting lines c—c and e—e.

When the housing shell 18 is generated, the casting or injection/extrusion molding compound of the shell connects with the beads 14 of the sliver 11. After the hardening of the housing shell, the sliver insert, in the exemplary embodiment the metal thread 12 with the silicon sleeve 13, can be pulled out of the jacket which is fused from the beads and the shell mass, of the generated channel 19 of the housing shell. The housing shell 18 shown in FIG. 5 is taken out of the negative form and the overprojecting casting rests 20, 21 are removed along the cutting lines c—c of e—e. If desired, the channel 19 can be countersunk and the housing shell polished. The housing shell 18 can be closed in a well-known manner by a cover plate to be applied to the proximal end 22 in the distal end 23. In the cover plate (not shown) as well as in the face plate, bores must be drilled if the channel 19 extends in the longitudinal direction completely through the housing shell. It is also possible, however, that the one or the other bore of the channel 19 (vent) is provided at a sidewall of the housing shell.

Figure 6:
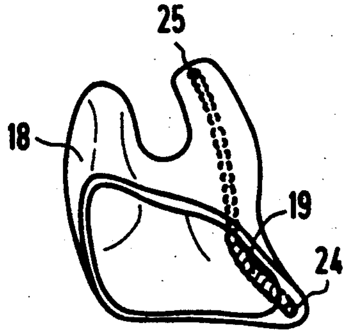
FIG. 6 is a perspective view showing a through hole of the channel located at the distal end of the housing shell.

The perspective view according to FIG. 6 illustrates a bore 24 of the channel 19 located at the distal end of the housing shell 18, whereby also the channel wall with the bead or small ball structure can be recognized. The bore of the channel provided at the proximal end is referenced 25.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A housing shell for an in-the-ear hearing aid and manufactured by the process comprising the steps of:

(a) forming a positive ear mold from the ear of a patient from a predetermined material;

(b) adjusting the size of the positive ear mold to the desired size of the housing shell to be manufactured and to include a proximal end and a distal end;

(c) applying a core to extend from the positive ear mold at the proximal end thereof to the distal end thereof which is to communicate with the auditory canal of the patient;

(d) applying a separating layer over the outer surface of the positive ear mold;

(e) forming a negative form with the positive ear mold and the core;

(f) removing the positive ear mold and the core form the negative form to form a cavity and a passageway communicating the cavity with the exterior of the negative form and removing the core to provide a passageway from the exterior to the interior of the negative form;

(g) applying a conduit through the passageway, including a sleeve of said predetermined material and a removable strand of a predetermined diameter extending therethrough, to the inner surface of the negative form extending from the passageway at the proximal end to the distal end against the inner surface of the negative form and with the strand including two ends each projecting from the respective proximal end and the distal end;

(h) filling the negative form with a polymerizable, hardenable plastic material;

(i) after a short polymerization time to bond the sleeve to the said inner surface of said negative form and pouring excess plastic material from the negative form to leave a layer of plastic therein to provide the having desired thickness of the housing shell;

(j) curing to harden the housing shell in the negative form;

(k) removing the hardened housing shell from the negative form; and (l) pulling the strand form the conduit to leave a vent passageway through the housing shell.

2. The housing shell constructed in accordance with claim 1, wherein the step (e) of forming a negative form from the positive ear mold and the core is further defined as:

(e1) placing the positive ear mold into a container so that it rests on its distal end; and (e2) filling the container with a casting material to cover the positive ear mold and at least a portion of the core.

3. The housing shell for an in-the-ear hearing aid constructed according to claim 1, wherein the steps (g) and (h) are further defined as:

(g1) applying a conduit of a first material, including a removal strand extending therethrough; and (h1) filling the negative form with the first material which is a hardenable plastic material.

4. The housing shell for an in-the-ear hearing aid constructed according to claim 1, wherein the steps (g) and (h) ar further defined as:

(g1) applying a conduit of a first material, including a removal strand extending therethrough; and (h1) filling the negative form with a second hardenable plastic material which is similar to said first material.

5. The housing shell for an in-the-ear hearing aid, constructed according to claim 1, wherein the step (g) of applying a conduit is further defined as:

(g1) applying a conduit of silicon.

6. The housing shell for an in-the-ear hearing aid constructed in accordance with claim 1, wherein the step (h) of filling the negative form with a hardenable plastic material is further defined as:

(h1) filling the negative form with polymethyl methacrylate.

7. The housing shell for an in-the-ear hearing aid constructed in accordance with claim 1, wherein the step (g) of applying a conduit is further defined as:

(g1) applying a conduit comprising a tube and a plurality of balls strung on said tube.

8. The housing shell for an in-the-ear hearing aid constructed in accordance with claim 1, wherein the step (g) of applying a conduit is further defined as:

(g1) applying a conduit comprising a tube and a plurality of rolls strung on said tube.

9. The housing shell for an in-the-ear hearing aid constructed in accordance with claim 1, wherein the step (g) of applying a conduit, including a strand extending therethrough, is further defined as:

(g1) applying a conduit, including a removable metal strand extending therethrough to the inner surface of the negative form.

* * * * *